(12) United States Patent
Kwon et al.

(10) Patent No.: US 10,656,832 B2
(45) Date of Patent: May 19, 2020

(54) MEMORY SYSTEM AND OPERATION METHOD THEREOF

(71) Applicant: SK hynix Inc., Gyeonggi-do (KR)

(72) Inventors: Jung-Hyun Kwon, Seoul (KR); Sung-Eun Lee, Gyeonggi-do (KR); Sang-Gu Jo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/617,109

(22) Filed: Jun. 8, 2017

(65) Prior Publication Data

US 2018/0113620 A1 Apr. 26, 2018

(30) Foreign Application Priority Data

Oct. 24, 2016 (KR) .................. 10-2016-0138385

(51) Int. Cl.
*G06F 3/06* (2006.01)
*G06F 12/02* (2006.01)
*G06F 12/06* (2006.01)

(52) U.S. Cl.
CPC ............ *G06F 3/0604* (2013.01); *G06F 3/064* (2013.01); *G06F 3/0616* (2013.01); *G06F 3/0653* (2013.01); *G06F 3/0679* (2013.01); *G06F 3/0685* (2013.01); *G06F 12/0246* (2013.01); *G06F 12/0638* (2013.01); *G06F 2212/205* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 6,985,992 B1 | 1/2006 | Chang et al. | |
| 9,032,137 B2 | 5/2015 | Damle et al. | |
| 2007/0294490 A1* | 12/2007 | Freitas | G06F 12/0246 711/154 |
| 2011/0246701 A1* | 10/2011 | Kano | G06F 12/0246 711/103 |
| 2011/0264843 A1* | 10/2011 | Haines | G06F 12/0246 711/103 |

\* cited by examiner

*Primary Examiner* — Charles J Choi
(74) *Attorney, Agent, or Firm* — IP & T Group LLP (57) ABSTRACT

A memory system comprises a memory device including a plurality of memory blocks, a write operation check unit configured to count the number of write operations performed on the respective memory blocks, a write count distribution management module configured to manage a distribution of the memory blocks based on the counted number of the write operations, and a wear leveling module configured to detect hot and cold memory blocks from the plurality of memory blocks based on the counted number of the write operation and the distribution, wherein the wear leveling module manages a history of the hot memory block and swaps the hot memory block with the cold memory block according to the managed history.

17 Claims, 5 Drawing Sheets

FIG. 2

FIG. 3 hot memory block

| ID | 1234 |
|---|---|
| WCNT | 5001 |
| FLAG | 0 |
| PA | 1024 | cold memory block

| ID | 50 |
|---|---|
| WCNT | 10 |
| FLAG | 0 |
| PA | 4096 | just swapped
hot memory block

| ID | 50 |
|---|---|
| WCNT | 5001 |
| FLAG | 1 |
| PA | 1024 | just swapped
cold memory block

| ID | 1234 |
|---|---|
| WCNT | 10 |
| FLAG | 0 |
| PA | 4096 |

MEMORY SYSTEM AND OPERATION METHOD THEREOF

CROSS-REFERENCE TO RELATED APPLICATIONS

The present application claims priority of Korean Patent Application No. 10-2016-0138385, filed on Oct. 24, 2016, which is incorporated herein by reference in its entirety.

BACKGROUND

1. Field

Exemplary embodiments relate to a memory system, and more particularly, to a memory system that performs wear-leveling for a nonvolatile memory device and an operation method thereof.

2. Description of the Related Art

Memory devices are largely classified into volatile and nonvolatile memory devices.

A volatile memory device has a fast write and read speed, but stored data is lost when power is off. Examples of a volatile memory device include a dynamic random access memory (DRAM), a static RAM (SRAM) and the like. A nonvolatile memory device has a relatively slow write and read speed, but stored data is retained although power is off. Accordingly, for retaining stored data regardless of the status of the power supply, a nonvolatile memory device is typically used. Examples of a nonvolatile memory device include a read only memory (ROM), a mask ROM (MROM), a programmable ROM (PROM), an erasable programmable ROM (EPROM), an electrically erasable programmable ROM (EEPROM), a flash memory, a phase change random access memory (PCRAM), a magnetic RAM (MRAM), a resistive RAM (RRAM), a ferroelectric RAM (FRAM) and the like.

Generally, nonvolatile memory devices, for example, the RRAM, and the PCRAM have limited write endurance. The write endurance is typically defined as the number of program/write cycles which can be applied to a memory block of the nonvolatile memory device before the memory block becomes unreliable. The write endurance may be calculated by estimating how often and how evenly a memory cell area is used.

When a write operation is concentrated on a specific memory cell area, the lifespan of the memory device may be suddenly reduced. To prevent this, a wear leveling operation is typically performed which distributes the write operations more uniformly over an entire cell area of the memory device. Hence, wear leveling can extend the write endurance of a storage medium. This technology allows more even distribution of write operations when data is recorded on a storage medium. By preventing a specific area of the storage medium from being intensively used, the entire area of the storage medium is evenly used. Typically, the wear leveling operation is performed by a memory controller. For example, when a write request for the storage medium is inputted from a host, the memory controller may perform and change appropriate mapping between a logical address and a physical address with reference to the number of overwrites for each memory cell, thereby controlling a write operation to be mainly performed on empty memory cells which have been used less.

SUMMARY

Various embodiments are directed to a memory system that performs wear-leveling for a plurality of memory blocks according to the number of write operations performed on the memory blocks, and manages the history of the wear-leveling performed on the memory blocks, and an operation method thereof.

In accordance with an embodiment of the present invention, a memory system includes: a memory device including a plurality of memory blocks; a write operation check unit configured to count the number of write operations performed on the respective memory blocks; a write count distribution management module configured to manage a distribution of the memory blocks based on the counted number of the write operations; and a wear leveling module configured to detect hot and cold memory blocks from the plurality of memory blocks based on the counted number of the write operation and the distribution, wherein the wear leveling module manages a history of the hot memory block and swaps the hot memory block with the cold memory block according to the managed history.

In accordance with an embodiment of the present invention, an operation method of a memory system includes: managing a distribution of a plurality of memory blocks based on the number of write operations performed on the respective memory blocks; detecting a hot memory block among the memory block based on the distribution; checking a history of the detected hot memory block; swapping the detected hot memory block with a cold memory block of a cold memory block list when the history of the detected hot memory block is in a first state; and changing the history of the swapped hot memory block to a second state.

In accordance with an embodiment of the present invention, an operation method of a memory system includes: checking the number of write operations of a memory block, among a plurality of memory blocks; detecting the memory block as a hot memory block when the memory block is included in a first upper range of a distribution of the memory blocks based on the checked number of write operations; checking a history of the detected hot memory block; swapping the detected hot memory block with a cold memory block of a cold memory block list when the history of the detected hot memory block is in a first state; and changing the history of the swapped hot memory block to a second state.

BRIEF DESCRIPTION OF THE DRAWINGS

The above and other features and advantages of the present invention will become more apparent to those skilled in the art to which the present invention pertains by the following detailed description with reference to the attached drawings in which.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that the drawings are simplified schematics and as such are not necessarily drawn to scale. In some instances, various parts of the drawings may have been exaggerated in order to more clearly illustrate certain features of the illustrated embodiments.

It is further noted that in the following description, specific details are set forth for facilitating the understanding of the present invention, however, the present invention may be practiced without some of these specific details. Also, it is noted, that well-known structures and/or processes may have only been described briefly or not described at all to avoid obscuring the present disclosure with unnecessary well known details.

It is also noted, that in some instances, as would be apparent to those skilled in the relevant art, an element (also referred to as a feature) described in connection with one embodiment may be used singly or in combination with other elements of another embodiment, unless specifically indicated otherwise.

Figure 1:
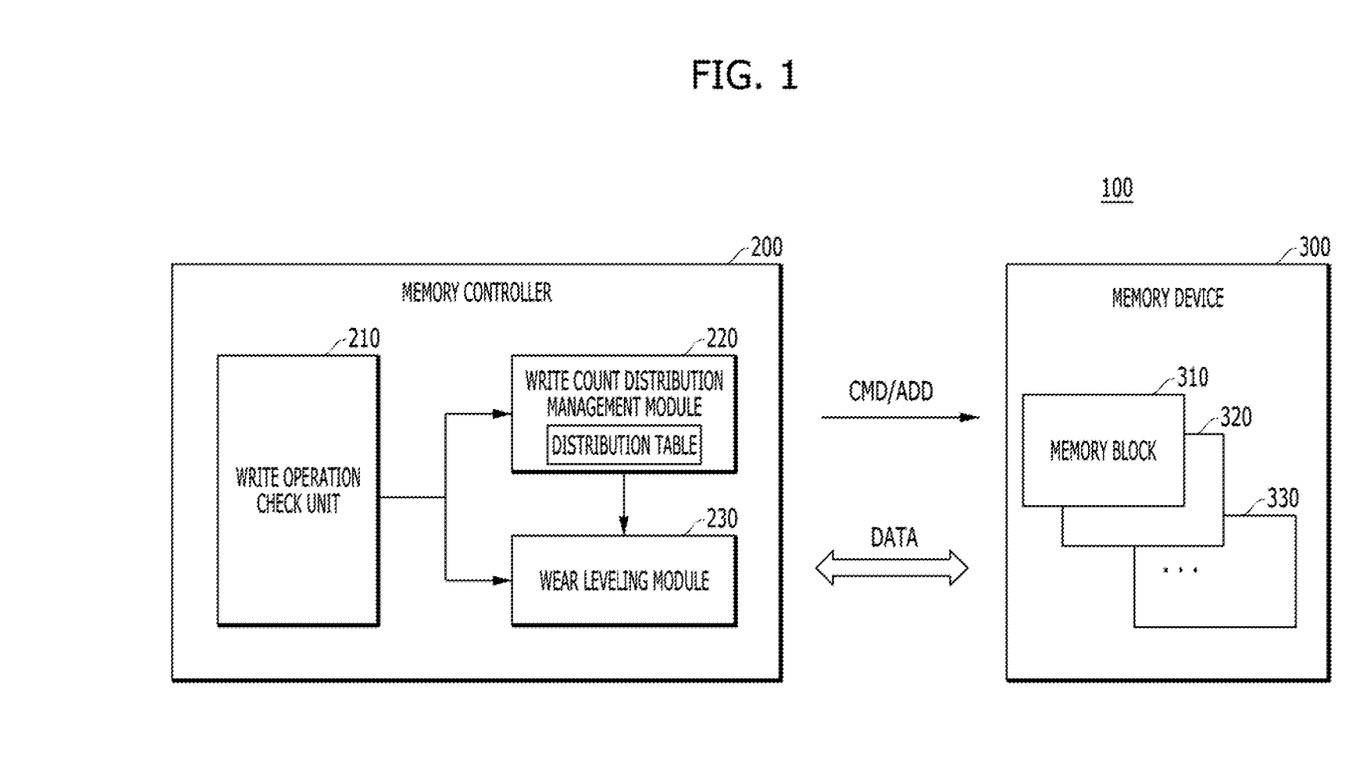
FIG. 1 is a block diagram illustrating a memory system in accordance with an embodiment of the present invention.

FIG. 1 is a block diagram illustrating a memory system 100 in accordance with an embodiment of the present invention.

Referring to FIG. 1, the memory system 100 may include a memory controller 200 and a memory device 300. The memory controller 200 may generate a command CMD and an address ADD according to a request received from a host (not illustrated), and may store data DATA in the memory device 300 or read data DATA from the memory device 300.

The memory device 300 includes a plurality of memory blocks 310 to 330. In accordance with an embodiment, the memory device 300 may be or include a PCRAM. However, the invention is not limited thereto and in other embodiments the memory device 300 may be or include a variable resistive memory device such as an MRAM, an RRAM, and an FRAM. The variable resistive memory device may divide stored data by the resistance of a memory cell. Furthermore, the variable resistance memory device may support an overwrite operation without performing an erase operation before writing data in the memory device. That is, through a write operation, data '0' stored in a memory cell may be changed to data '1' or data '1' may be changed to data '0'. Accordingly, the plurality of memory blocks 310 to 330 included in the memory device 300 may measure a wear level on the basis of the number of write operations performed on each of the plurality of memory blocks 310 to 330, i.e., based on the write count of each memory block.

The memory controller 200 may include a write operation check unit 210. The write operation check unit 210 may count the number of write operations which are performed on each of the plurality of the memory blocks 310 to 330 according to requests received from the host. The write operation check unit 210 may include a count section (not illustrated) for performing the counting. The write operation check unit 210 may check an identification (ID) of data on which the write operation is performed according to the request from the host, that is, a logical address of the data, count a repeatedly accessed physical address corresponding to a checked logical address, and measure the wear levels of the data storage areas, that is, the plurality of the memory blocks 310 to 330.

The memory controller 200 may further include a write count distribution management module 220 and a wear leveling module 230. The write count distribution management module 220 may manage the write count distribution of each of the plurality memory blocks 310 to 330 based on the write counts measured by the write operation check unit 210, i.e., based on the cumulative number of write operations performed on each memory block. The write count distribution management module 220 may divide the number of write operations of the plurality of the memory blocks 310 to 330, into a plurality of sections, count the number memory blocks among the plurality of the memory blocks 310 to 330 which have a write count falling within each of the respective sections, and store the counted number of the plurality of the memory blocks 310 to 330 as the write count distribution in a distribution table. As write operations are continuously performed on the memory blocks 310 to 330, the write count distribution of the plurality of the memory blocks 310 to 330 may change, and the changes will be updated in the distribution table stored in the write count distribution management module 220. Such an operation of the write count distribution management module 220 will be described in more detail with reference to FIG. 2.

On the basis of the write counts of the plurality of the memory blocks 310 to 330 measured by the write operation check unit 210, that is, the number of write operations, and the distribution table of the write count distribution management module 220, the wear leveling module 230 may detect a hot memory block and a cold memory block among the plurality of the memory blocks 310 to 330. That is, the wear leveling module 230 may detect one or more hot memory blocks on which a relatively large number of write operations have been performed and one or more cold memory blocks on which a relatively small number of write operations have been performed. The wear leveling module 230 may swap a hot memory block with a cold memory block of the memory device 300, thereby allowing the memory blocks to be more uniformly used. A hot memory block and a cold memory block may be swapped by exchanging data between the hot memory block and the cold memory block.

The wear leveling module 230 in accordance with an embodiment may categorize the plurality of memory blocks 310 to 330 into a different section of the distribution table A of the write count distribution management module 220. That is, the wear leveling module 230 may categorize the memory blocks 310 to 330 into detailed sections of the distribution table A, such as a hot area, a mild area and a cold area according to the write count of each memory block. Accordingly, the wear leveling module 230 may readily detect memory blocks to be swapped, may manage the swapped memory blocks and may substantially prevent an unnecessary operation. The operation of the wear leveling module 230 in accordance with an embodiment will be described in more detail with reference to FIG. 3.

Figure 2:
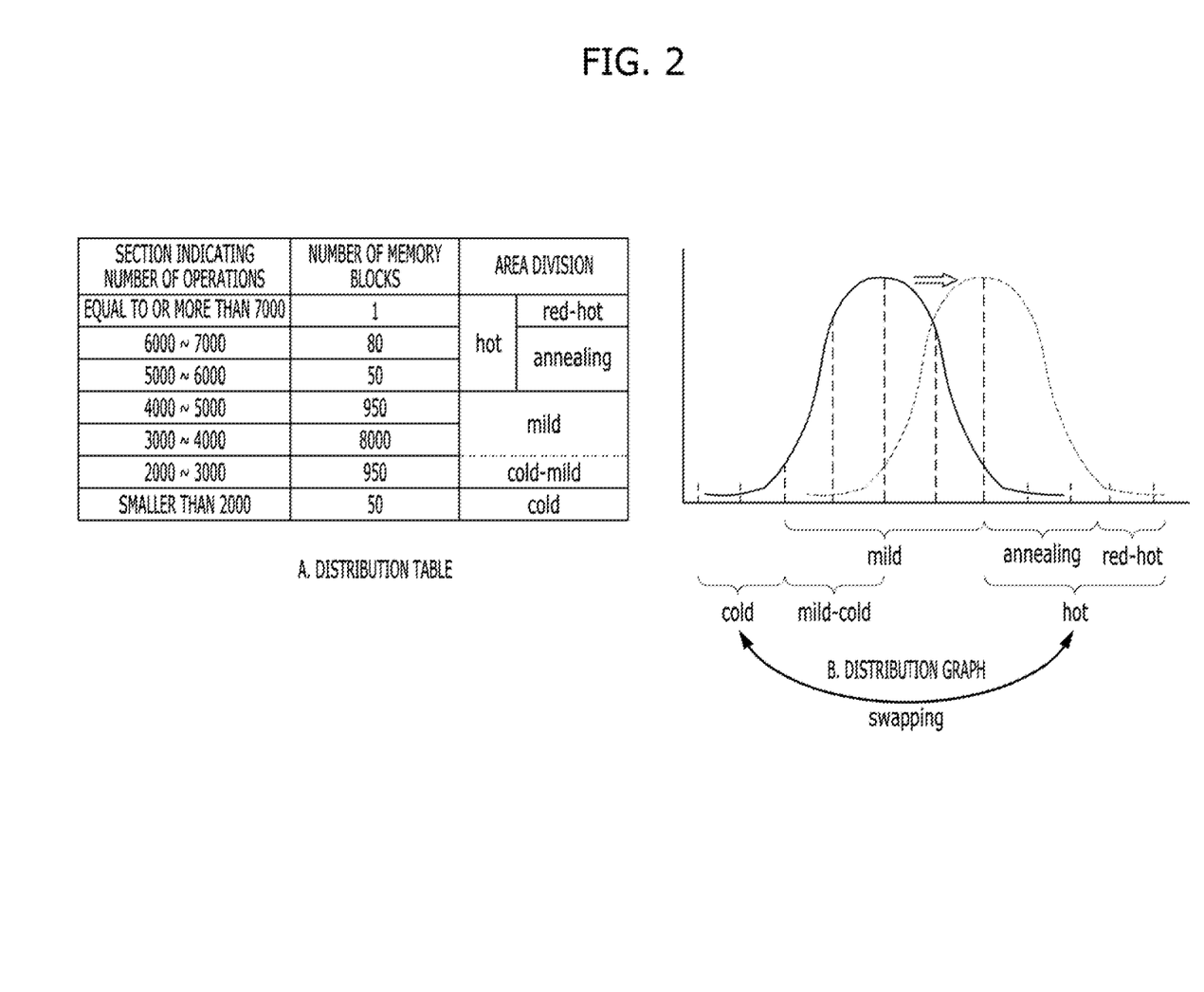
FIG. 2 is a diagram illustrating an exemplary operation of a write count distribution management module of the memory system illustrated in FIG. 1.

FIG. 2 is a diagram for explaining an operation of the write count distribution management module 220 of FIG. 1.

Referring to FIG. 2, a distribution table A stored in the write count distribution management module 220 and a distribution graph B are shown. The distribution graph B illustrates the write count distribution of the memory blocks based on the information of the distribution table A. Specifically, the x-axis of the distribution graph B represents the number of memory blocks and the y-axis of the distribution graph B represents the write count, i.e., the number of write operations.

The write count distribution management module 220 may divide the number of write operations into a plurality of sections. Referring to the distribution table A of FIG. 2, the number of write operations may be divided in a plurality of sections in units of thousands, i.e., '1000'; however, the embodiment is not limited thereto. In operation, the write operation check unit 210 may count the write count, i.e., the number of write operations, for each of the plurality memory blocks, and the write count distribution management module 220 may determine the number of memory blocks which are included in each one of the sections of the distribution table A on the basis of the write count. For example, at a given time, as illustrated in the distribution table A of the example of FIG. 2, 50 memory blocks may have a write count of less than 2000 and only one memory block may have a write operation count of equal to or more than 7000.

As write operations are continuously performed on the memory blocks, the write counts for the memory blocks may increase. Accordingly, the write count distribution of the memory blocks may change. For example, when a new write operation is performed on a memory block having a write count of 5,000, the write count for this memory block will increase by one and become 5001, which means that it will exceed 5,000. As a result, the write count distribution management module 220 will decrease the number of memory blocks in the section 4,000 to 5,000 of the distribution table A, by one, i.e., from 950 to 949 and increase the number of memory blocks, in the section 5,000 to 6,000 of the distribution table A, by one, i.e., from 50 to 51. As write operations are continuously performed on the plurality of memory blocks, the number of write operations will increase overall, so that the write count distribution of the memory blocks will shift to the right side as illustrated in the distribution graph B.

The write count distribution management module 220 may determine a plurality of areas for dividing the plurality of memory blocks on the basis of the write count distribution of the plurality of the memory blocks. That is, on the basis of the number of memory blocks included in the respective sections indicating the number of write operations stored in the distribution table A, an area including a predetermined range of memory blocks among all the memory blocks may be set. The write count distribution management module 220 may compare the total number of the memory blocks with the number of memory blocks included in the respective sections, and set respective areas. When the number of memory blocks which are included in the respective sections changes, the set areas may also change.

The write count distribution management module 220 may set a hot area in order for the wear leveling module 230 to detect memory blocks for which the write count (i.e., the number of write operations) is included in a predetermined upper range as hot memory blocks. For example, the wear leveling module 230 may detect memory blocks for which the number of write operations is in the top 3%, i.e., among about the upper 300 memory blocks ((1+80+50+950+8000+ 950+50)*0.03~302) as hot memory blocks. To this end, in the distribution table A of FIG. 2, the section in which the number of write operations is equal to or greater than 5,000 may be set as the hot area. The write count distribution management module 220 may set a cold area in order for the wear leveling module 230 to detect memory blocks for which the number of write operations is included in a predetermined lower range as cold memory blocks. When the cold area is also set at substantially the same ratio as that of the hot area, the section in which the number of write operations is smaller than 2,000 may be set as the cold area.

The write count distribution management module 220 may further subdivide the hot area into a red-hot area and an annealing area as illustrated in FIG. 2. For example, the write count distribution management module 220 may set a red-hot area in which the number of write operations is in an upper range in the hot area, and set an area below the red-hot area in the hot area as an annealing area. Furthermore, the write count distribution management module 220 may further subdivide a middle area between the hot area and the cold area, into a mild area and a mild-cold area as illustrated in FIG. 2. The write count distribution management module 220 may set an area near the cold area as the mild-cold area, and set an area near the hot area as the mild area. An operation for swapping memory blocks corresponding to the hot area and the cold area or a wear leveling operation according to respective areas will be described in more detail with reference to FIGS. 3 to 5.

Figure 3:
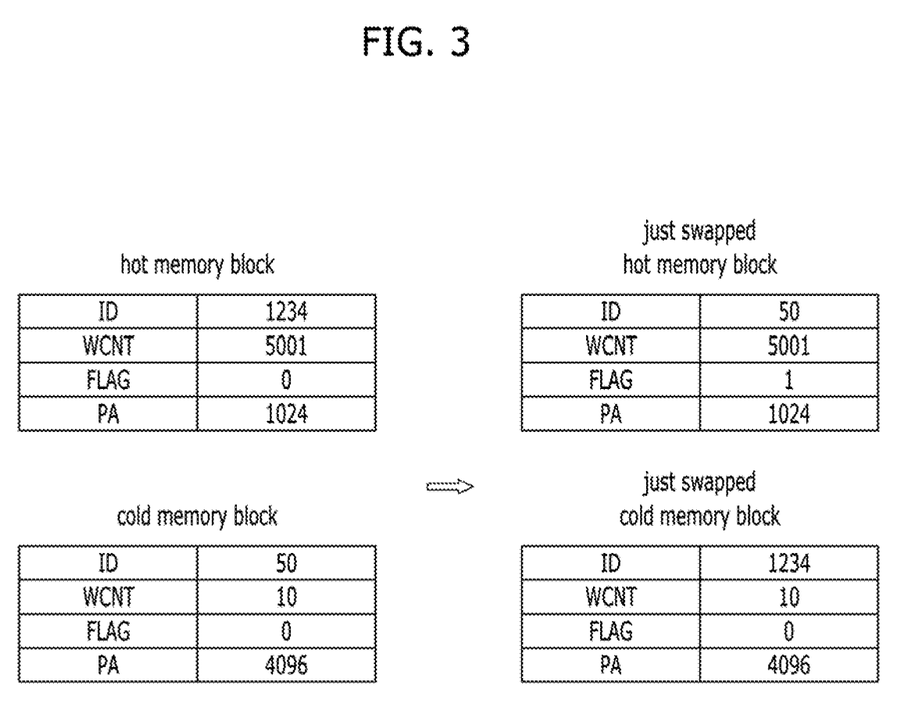
FIG. 3 is a diagram illustrating an operation of a wear leveling module of the memory system illustrated in FIG. 1.

FIG. 3 is a diagram for explaining an operation of the wear leveling module 230 of FIG. 1.

When a write operation is requested from the host, the write operation check unit 210 may update the number of write operations of memory blocks on which the write operation has been requested and notify the wear leveling module 230 of the updated number of write operations. On the basis of the notified number of write operations, the wear leveling module 230 may detect a corresponding memory block as the hot memory block by using the distribution degree of the distribution degree management module 220 when the corresponding memory block is included in a preset top percent. In FIG. 3, reference numeral "ID" denotes identification (ID) of data, that is, a logical address of the data, reference numeral "WCNT" denotes the write count (i.e., the number of write operations), reference numeral "FLAG" denotes flag information, and reference numeral "PA" denotes a physical address.

Referring to FIG. 3, it may be understood that a write operation of data with an ID of '1234' is performed and the write count WCNT, i.e., the number of write operations of the corresponding memory block increases to '5001'. For example, referring to the distribution table A of FIG. 2, the wear leveling module 230 may check that the corresponding memory block is included in the hot area and may detect the corresponding memory block as the hot memory block.

In this case, the wear leveling module 230 may separately manage a list of the cold memory blocks (hereinafter, referred to as a "cold memory block list"). The wear leveling module 230 may detect a cold memory block from a plurality of memory blocks and add the cold memory block to the cold memory block list, or may detect a cold memory block when the number of cold memory blocks of the cold memory block list is equal to or smaller than a reference value or when the memory device 300 operates in an idle state. The wear leveling module 230 may decide one of the plurality of memory blocks sequentially or randomly, and check the word count WCNT of the corresponding memory block from the write operation check unit 210. On the basis of the checked word count WCNT, the wear leveling module 230 detects whether or not the corresponding memory block is a cold memory block by using the distribution table of the write count distribution management module 220.

Referring to FIG. 3, it may be understood that a memory block corresponding to data with an ID of '50' is checked as the cold memory block from the cold memory block list. Accordingly, the wear leveling module 230 may swap the data with the ID of '1234' with the data with the ID of '50'. As a consequence, the data with the ID of '1234' may be moved from a memory block corresponding to a physical address (PA) of '1024' to a memory block corresponding to a physical address (PA) of '4096', and the data with the ID of '50' may be moved from the memory block corresponding to the physical address (PA) of '4096' to the memory block corresponding to the physical address (PA) of '1024'.

The data with the ID of '1234' may be hot data on which many write operations have been performed, but may be moved to the cold memory block (PA) of '4096' on which many write operations have not been performed, and thus memory blocks may be uniformly managed. However, although the data with the ID of '50' is the cold data, the data is moved to the hot memory block (PA) of '1024' in which the word count WCNT is set to '5001'. Thus, when any write operation is performed on the data with the ID of '50', the data may be detected as the hot memory block and swapping may be performed again.

In order to substantially prevent the swapping from occurring frequently, the wear leveling module 230 may generate flag information FLAG to manage a swapping history of hot memory blocks. That is, the wear leveling module 230 may manage the swapping history of the hot memory blocks based on the flag information FLAG denoting whether the hot memory blocks have been previously swapped, and then control the swapping between the hot memory blocks and the cold memory blocks. As illustrated in FIG. 3, after the swapping between hot and cold memory blocks, the wear leveling module 230 may change the flag information FLAG of a just swapped hot memory block to '1', thereby representing whether the hot memory block has been swapped. Furthermore, even when detecting the hot memory block, the wear leveling module 230 may check the flag information FLAG and decide whether to perform swapping between the hot memory block and the cold memory block according to the state of the flag information FLAG. The wear leveling module 230 may manage memory blocks, which are detected as the annealing area in the hot area of FIG. 2, by using such additional information, i.e., a swapping history. Furthermore, when the number of write operations exceeds a predetermined number of times, the wear leveling module 230 may manage memory blocks, which are detected as the red-hot area, regardless of a swapping history.

Figure 4:
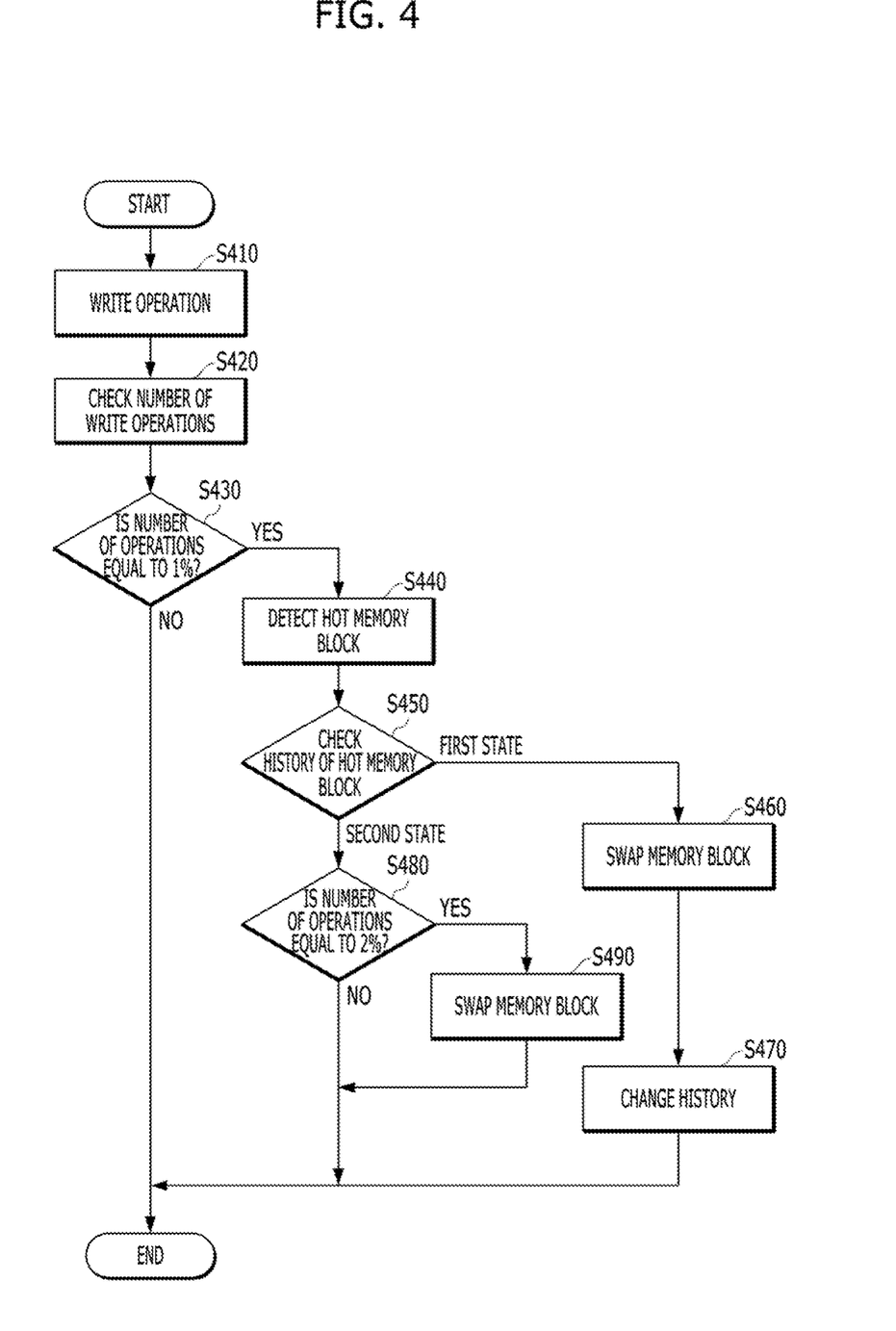
FIGS. 4 and 5 are flowcharts illustrating a wear leveling operation of a memory system in accordance with an embodiment of the present invention.
Figure 5:
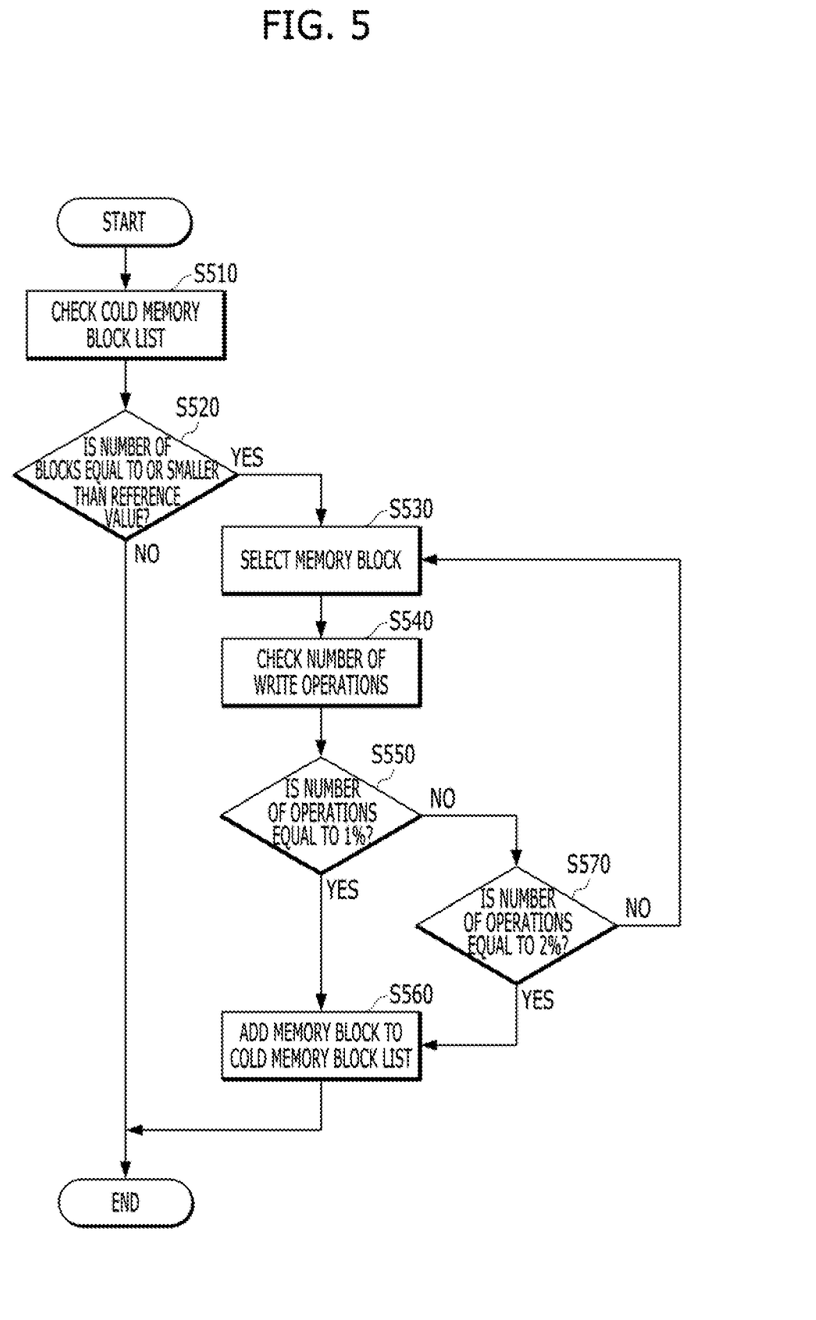

FIGS. 4 and 5 are flowcharts for explaining a wear leveling operation of a memory system in accordance with an embodiment of the present invention. FIG. 4 illustrates an operation for detecting a hot memory block according to the wear leveling operation of the memory system, and FIG. 5 illustrates an operation for detecting a cold memory block according to the wear leveling operation of the memory system.

Referring to FIG. 4, when the write operation is performed on one of a plurality of memory blocks by a request from the host at step S410 the write operation check unit 210 (see FIG. 1) may count the number of write operations of the corresponding memory block and notify the write count distribution management module 220 (see FIG. 1) and the wear leveling module 230 (see FIG. 1) of the counted number of write operations. The write count distribution management module 220 may manage a write count distribution of the memory blocks in a distribution table based on the notified number of write operations. The wear leveling module 230 may check the notified number of write operations at step S420, and compare the notified number of write operations with the number of write operations of other memory blocks on the basis of the write count distribution of the memory blocks stored in the distribution table at step S430.

When the notified write count corresponds to the write counts of memory blocks which are in the top 1% (YES of S430), the wear leveling module 230 may detect the corresponding memory block as the hot memory block at step S440. That is, when the memory block subjected to the write operation is included in the first upper range, i.e., top k % of the write count distribution on the basis of the number of write operations, the memory block may be detected as a hot memory block.

The wear leveling module 230 may check a swapping history of the detected hot memory block at step S450. The plurality of memory blocks may have a swapping history in a first or a second state. The swapping history in the first state may indicate that a corresponding memory block has been unswapped, and the swapping history in the second state may indicate that the corresponding memory block has been swapped. The wear leveling module 230 may check flag information FLAG corresponding to the detected hot memory block and check whether the detected hot memory block has been swapped.

When the swapping history of the detected hot memory block is in the first state (the first state of S450), the wear leveling module 230 may swap the detected hot memory block with the cold hot memory block of the cold memory block list at step S460. After swapping between the detected hot memory block and the cold hot memory block, the wear leveling module 230 may change the swapping history of the swapped hot memory block to the second state at step S470.

When the swapping history of the detected hot memory block is in the second state (the second state of S450), the wear leveling module 230 may compare the number of write operations of the detected hot memory block with the number of write operations of the other memory blocks again at step S480. On the basis of the write count distribution of the plurality of memory blocks stored in the distribution table, when the number of write operations of the detected hot memory block corresponds to the number of write operations of memory blocks in the second upper range, i.e., top k-a % (YES of S480), the wear leveling module 230 may swap the detected hot memory block with the cold memory block of the cold memory block list at step S490.

That is, when the detected hot memory block is included in the second upper range of the distribution on the basis of the number of write operations, the detected hot memory block may be swapped with the cold memory block. In this case, the second upper range may be higher than the first upper range. Referring to FIG. 2, the second upper range of the distribution may indicate the red-hot area. Accordingly, the detected hot memory block is included in the red-hot area and may be swapped with the cold memory block regardless of the swapping history.

FIG. 5 illustrates an operation in which the wear leveling module 230 detects the cold memory block to be swapped with the hot memory block and manages the cold memory block list.

Referring to FIG. 5, the wear leveling module 230 may detect the cold memory block from a plurality of memory blocks and add the cold memory block to the cold memory block list, when the memory device 300 operates in an idle state. Alternatively, the wear leveling module 230 may check the cold memory block list at step S510, and detect the cold memory block from the plurality of memory blocks when the number of cold memory blocks is equal to or smaller than a reference value at step S520.

When the number of cold memory blocks is equal to or smaller than the reference value (YES of step S520), the wear leveling module 230 may select one from the plurality of memory blocks sequentially or randomly at step S530. The wear leveling module 230 may check the number of write operations of the selected memory block from the write operation check unit 210.

On the basis of the write count distribution of the plurality of memory blocks stored in the distribution table, the wear leveling module 230 detects whether the selected memory block is the cold memory block according to the checked number of write operations. To this end, on the basis of the write count distribution of the plurality of memory blocks, the wear leveling module 230 may compare the checked number of write operations with the number of write operations of other memory blocks at step S550.

When the checked number of write operations of the selected memory block corresponds to the number of write operations of memory blocks of which the write count distribution is in the first lower range, i.e., bottom k % (YES of S550), the wear leveling module 230 may detect the selected memory block as the cold memory block. That is, when the selected memory block is included in the first lower range of the distribution on the basis of the number of write operations, the selected memory block may be detected as the cold memory block. Accordingly, the selected memory block may be added to a first list of the cold memory block list at step S560.

When the selected memory block is not included in the first lower range of the write count distribution (NO of S550), the wear leveling module 230 may compare the number of write operations of the selected memory block with the number of write operations of the other memory blocks again at step S570. On the basis of the write count distribution of the plurality of memory blocks stored in the distribution table, when the number of write operations of the selected memory block corresponds to the number of write operations of memory blocks of which the write count distribution is in the second lower range, i.e., bottom k+a % (YES of S570), the wear leveling module 230 may detect the selected memory block as a preliminary cold (that is, the mild-cold) memory block. That is, when the selected memory block is included in the second lower range of the write count distribution on the basis of the number of write operations, the selected memory block may be detected as the mild-cold memory block. In this case, the second lower range may be higher than the first lower range. Accordingly, the selected memory block may be added to a second list of the cold memory block list at step S560.

When the selected memory block is not included in the second lower range of the write count distribution (NO of S570), the wear leveling module 230 may select memory blocks next to the plurality of memory blocks or may randomly select other memory blocks at step S530, and may repeat the operations at steps S540, S550, S560, and S570 for detecting the cold memory block. Furthermore, when checking the cold memory block to be swapped with the detected hot memory block, the wear leveling module 230 may check the cold memory block from the first list to the second list of the cold memory block list. That is, the wear leveling module 230 may first check the cold memory block in the first list, and may check the preliminary cold (that is, the mild-cold) memory block in the second list when there is no detected cold memory block in the first list.

Before the operations for detecting the hot memory block and the cold memory block illustrated in FIG. 4 and FIG. 5, an operation for managing the write count distribution of the plurality of memory blocks may be performed although not illustrated in the drawings. That is, after the write operation check unit 210 counts the number of write operations performed on the plurality of memory blocks, the write count distribution management module 220 (see FIG. 1) may manage the write count distribution of the plurality of memory blocks in the distribution table on the basis of the counted numbers. The write count distribution management module 220 may divide the number of write operations of the plurality of memory blocks into a plurality of ranges, count the number of memory blocks included in the respective sections, and store the counted number in the distribution table. As write operations are continuously performed, the number of memory blocks included in the respective ranges may be changed and values stored in the distribution table by the write count distribution management module 220 may also be changed. Accordingly, as illustrated in FIG. 2, the write count distribution of the plurality of memory blocks corresponding to the distribution table may be shifted to the right side according to the write operation.

In the present technology, among a plurality of memory blocks, a hot memory block on which a relatively large number of write operations have been performed, is swapped with a cold memory block on which a relatively small number of write operations have been performed, so that a history of the swapped hot memory block may be separately managed. On the basis of such a swapping history, even though a memory block swapped once is detected as the hot memory block, it is possible to substantially prevent the memory block from being swapped again and to reduce an indiscriminate increase in a wear level.

Furthermore, on the basis of a distribution of memory blocks based on the number of write operations, it is possible to subdivide an area from which a hot memory block or a cold memory block is detected. Accordingly, in the case of the hot memory block, a condition-reinforced area is added, so that a hot (i.e., a red-hot) memory block to be subjected to wear leveling may be detected regardless of the swapping history. In the case of the cold memory block, a condition-relaxed area is added, so that a preliminary cold (i.e., a mild-cold) memory block may be detected and preserved in a list although the cold memory block is not well detected.

Although various embodiments have been described for illustrative purposes, it will be apparent to those skilled in the art that various changes and modifications may be made without departing from the spirit and scope of the invention as defined in the following claims.

What is claimed is:
1. A memory system comprising:
a memory device including a plurality of memory blocks;
a write operation check circuit configured to count numbers of write operations performed on the plurality of memory blocks, respectively;
a write count distribution management hardware module configured to manage a distribution of the plurality of memory blocks based on the counted number of the write operations; and
a wear leveling hardware module configured to detect a hot memory block and a cold memory block from the plurality of memory blocks based on the counted numbers of the write operations and the distribution, wherein the hot memory block is included in a first upper range of the distribution, wherein the wear leveling hardware module manages a history of the hot memory block to indicate whether a cold data of the cold memory block is moved to the hot memory block and swaps the hot memory block with the cold memory block when the history of the hot memory block indicates that the hot memory block is unswapped, wherein the wear leveling module checks whether the hot memory block is included in a second upper range higher than the first upper range of the distribution when the history of the hot memory block indicates that the hot memory block is swapped and swaps the checked hot memory block with the cold memory block when the checked hot memory block is included in the second upper range of the distribution.

2. The memory system of claim 1, wherein the write count distribution management hardware module divides the numbers of the write operations into a plurality of sections, counts numbers of memory blocks included in the plurality of sections, respectively, based on the numbers of write operations, and stores the numbers of memory blocks in a distribution table.

3. The memory system of claim 1, wherein the wear leveling hardware module manages the history of the hot memory block using flag information denoting whether the hot memory block is swapped.

4. An operation method of a memory system, comprising:
managing a distribution of a plurality of memory blocks based on numbers of write operations performed on the plurality of memory blocks, respectively;
detecting a hot memory block which is included in a first upper range of the distribution among the plurality of memory block based on the distribution;
checking a history of the detected hot memory block;
swapping the detected hot memory block with a cold memory block of a cold memory block list when the history of the detected hot memory block is in a first state indicating that the detected hot memory block is unswapped;
checking whether the detected hot memory block is included in a second upper range higher than the first upper range of the distribution when the history of the detected hot memory block is in a second state indicating that the detected hot memory block is swapped;
swapping the checked hot memory block with the cold memory block of the cold memory block list when the checked hot memory block is included in the second upper range of the distribution; and
changing the history of the swapped hot memory block to the second state indicating that a cold data of the cold memory block is moved to the swapped hot memory block.

5. The operation method of the memory system of claim 4, wherein the detecting of the hot memory block comprises:
checking the numbers of write operations performed on a memory block among the plurality of memory blocks; and
detecting the memory block as the hot memory block when the memory block is included in the first upper range of the distribution based on the checked number.

6. The operation method of the memory system of claim 5, wherein the detecting of the memory block as the hot memory block comprises:
comparing the checked number with numbers of write operations performed on one or more memory blocks which are included in the first upper range of the distribution, based on a distribution table indicating numbers of memory blocks corresponding to the plurality of sections.

7. The operation method of the memory system of claim 4, further comprising:
detecting an additional cold memory block from the plurality of memory blocks when a number of cold memory blocks of the cold memory block list is equal to or smaller than a reference value, and adding the detected cold memory block to the cold memory block list.

8. The operation method of the memory system of claim 7, wherein the detecting of the additional cold memory block and the adding of the detected cold memory block to the cold memory block list comprises:
checking a number of write operations performed on a first memory block among the plurality of memory blocks; and
adding the first memory block to a first list of the cold memory block list when the first memory block is included in a first lower range of the distribution based on the number of write operations performed on the first memory block.

9. The operation method of the memory system of claim 8, wherein the detecting of the additional cold memory block and the adding of the detected cold memory block to the cold memory block list further comprises:
checking whether the first memory block is included in a second lower range higher than the first lower range of the distribution when the first memory block is out of the first lower range of the distribution based on the number of write operations performed on the first memory block; and
adding the first memory block to a second list of the cold memory block list when the first memory block is included in the second lower range of the distribution.

10. The operation method of the memory system of claim 9, wherein, when the first memory block is out of the second lower range of the distribution, the detecting of the cold memory block and the adding of the detected cold memory block to the cold memory block list are repeated on a second memory block among the plurality of memory blocks.

11. The operation method of the memory system of claim 9, wherein the swapping of the detected hot memory block with the cold memory block of the cold memory block list comprises:
checking the cold memory block to be swapped in sequence of the first list and the second list from the cold memory block list.

12. The operation method of the memory system of claim 4, wherein the managing of the distribution based on the numbers of write operations performed on the plurality of memory blocks comprises:
counting the numbers of the write operations performed on the plurality of memory blocks; and
dividing the counted numbers of the write operations into a plurality of sections, counting numbers of memory blocks included in the plurality of sections, respectively, based on the counted numbers of the write operations, and storing the counted numbers of memory blocks in a distribution table.

13. An operation method of a memory system, comprising:
checking a number of write operations of a memory block, among a plurality of memory blocks;
detecting the memory block as a hot memory block when the memory block is included in a first upper range of a distribution of the plurality of memory blocks based on the checked number of write operations;

checking a history of the detected hot memory block;

swapping the detected hot memory block with a cold memory block of a cold memory block list when the history of the detected hot memory block is in a first state indicating that detected hot memory block is unswapped;

checking whether the detected hot memory block is included in a second upper range higher than the first upper range of the distribution when the history of the detected hot memory block is in a second state indicating that the detected hot memory block is swapped;

swapping the checked hot memory block with the cold memory block of the cold memory block list when the checked hot memory block is included in the second upper range of the distribution; and changing the history of the swapped hot memory block to the second state indicating that a cold data of the cold memory block is moved to the swapped hot memory block.

14. The operation method of the memory system of claim 13, further comprising:

detecting an additional cold memory block from the plurality of memory blocks when a number of cold memory blocks of the cold memory block list is equal to or smaller than a reference value, and adding the detected cold memory block to the cold memory block list.

15. The operation method of the memory system of claim 14, wherein the detecting of the additional cold memory block and the adding of the detected cold memory block to the cold memory block list comprises:

checking a number of write operations performed on a first memory block among the plurality of memory blocks; and adding the first memory block to a first list of the cold memory block list when the first memory block is included in a first lower range of the distribution based on the number of write operations performed on the first memory block.

16. The operation method of the memory system of claim 15, wherein the detecting of the cold memory block and the adding of the detected cold memory block to the cold memory block list further comprises:

checking whether the first memory block is included in a second lower range higher than the first lower range of the distribution when the first memory block is out of the first lower range of the distribution based on the number of write operations performed on the first memory block; and adding the first memory block to a second list of the cold memory block list when the first memory block is included in the second lower range of the distribution.

17. The operation method of the memory system of claim 16, wherein, when the first memory block is out of the second lower range of the distribution, the detecting of the cold memory block and the adding of the detected cold memory block to the cold memory block list are repeated on a second memory block among the plurality of memory blocks.

* * * * *